Dec. 1, 1953 F. H. REINDL 2,660,988
MANIFOLD
Filed Oct. 27, 1952 4 Sheets-Sheet 2

INVENTOR.
FRANCIS H. REINDL
BY Carl J. Barbee
ATTORNEY

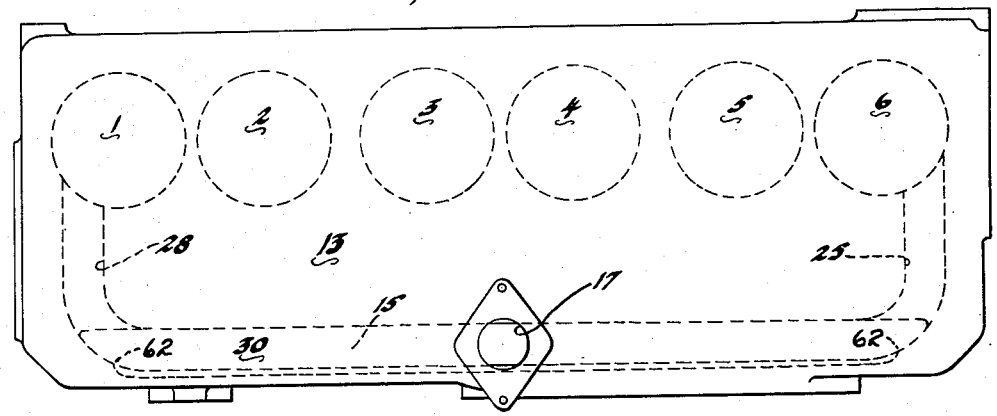
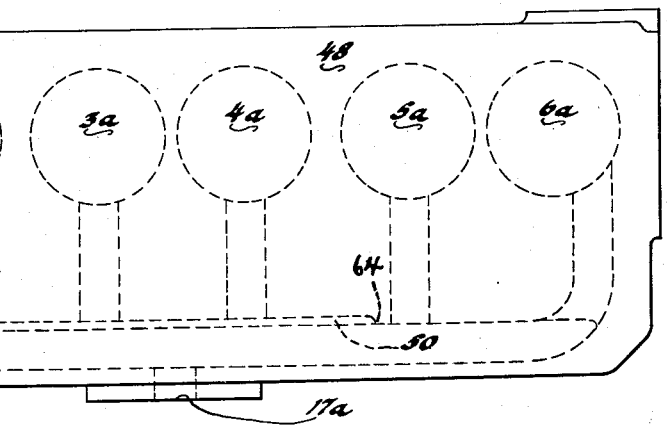

Dec. 1, 1953   F. H. REINDL   2,660,988
MANIFOLD
Filed Oct. 27, 1952   4 Sheets-Sheet 4
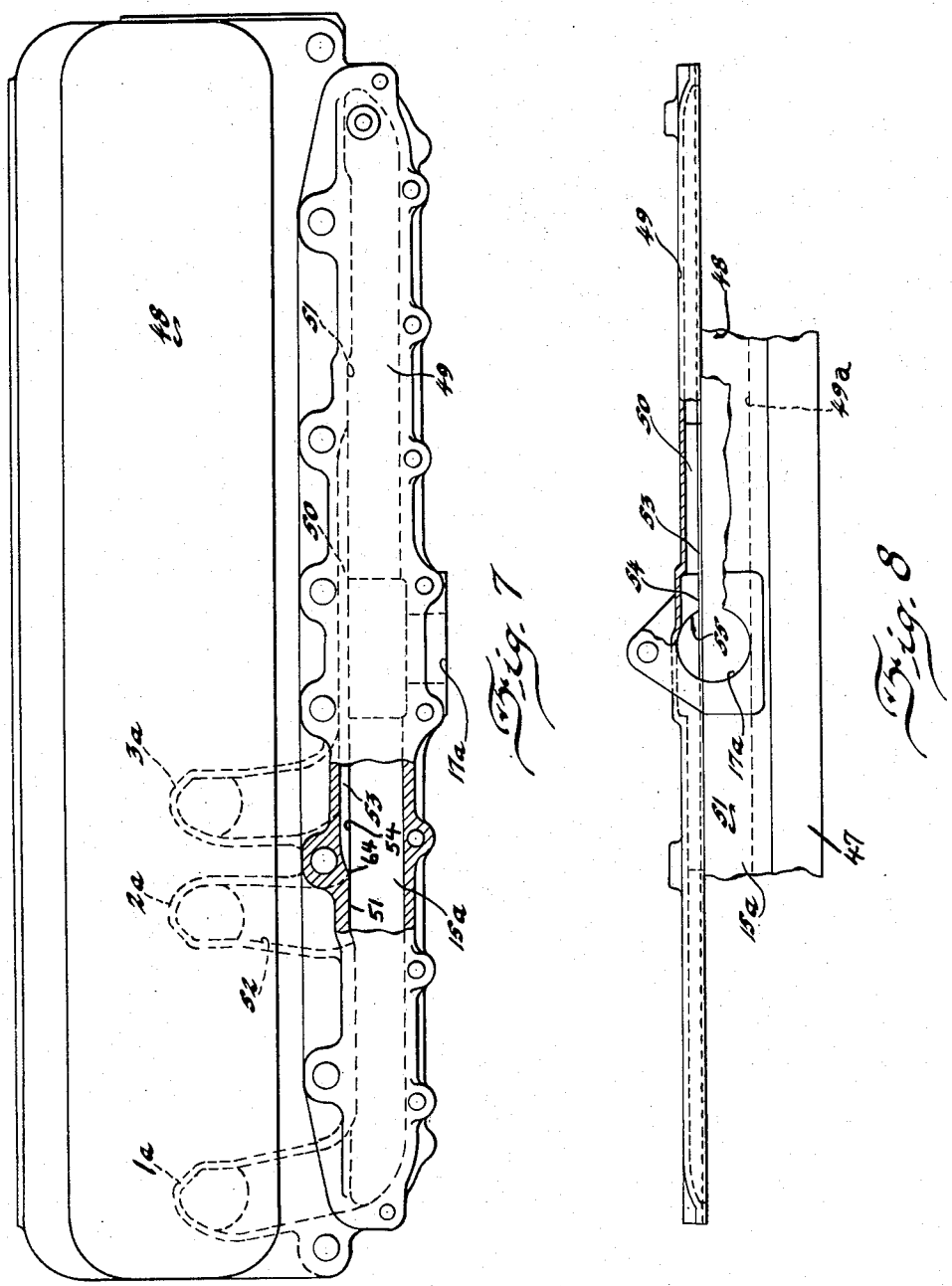
INVENTOR.
FRANCIS H. REINDL
BY Carl J. Barbee
ATTORNEY Patented Dec. 1, 1953

2,660,988

UNITED STATES PATENT OFFICE 2,660,988

MANIFOLD

Francis H. Reindl, Kenosha, Wis., assignor to Nash-Kelvinator Corporation, Kenosha, Wis., a corporation of Maryland Application October 27, 1952, Serial No. 317,110

11 Claims. (Cl. 123—52)

This invention relates to internal combustion engines and more particularly to an intake manifold structure therefore in which the fuel is distributed to a plurality of cylinders.

An object of my invention is to effect a predetermined fuel mixture distribution for multicylinder internal combustion engines by providing an intake manifold structure adapted for providing a fuel mixture distribution tending to effect an improved performance in the operation of the engine.

Another object of my invention is to provide the improved fuel mixture distributing device for a multi-cylinder-in-line engine in which the intake cycle of one of the engine cylinders overlaps with respect to the intake cycle of another engine cylinder by providing means for equalizing the fuel mixture flow to counteract the tendency towards unequal distribution as induced by the overlapping intake cycles of some of the engine cylinders.

A further object of this invention is to provide novel means for equally distributing the fuel in a manifold to several cylinders and is equally effective whether used in conjunction with so-called down draft types of carburetors or side draft types of carburetors.

The inherent tendency toward unequal distribution of fuel in multi-cylinder-in-line engines is of course ever present in engines of the above type and various arrangements have been used to counteract such unequal distribution. It will be manifest, from the foregoing, that it is my chief aim to generally improve upon prior structures of the present type.

The present invention is characterized by providing an elongated channel, milled, or otherwise formed, preferably in the cylinder head. When the head is positioned on the top portion of a cylinder block, separated only by a gasket, such channel and a portion of said gasket form a passageway or a shelf. This shelf provides a path over which the fuel mixture may be directed to certain pre-selected cylinders of a multi-cylinder-in-line engine. When my arrangement is used with an engine having a side draft carburetor, I have found that cylinders 2 and 5 are slightly "weaker" than cylinders 1, 3, 4 and 6 and therefore it is desirable to supply additional or auxiliary fuel to these "weaker" cylinders. When my arrangement is used with an engine having a down draft carburetor, I have found that cylinders 1 and 6 are slightly "weaker" than the remaining cylinders and auxiliary fuel needs to be directed to these "weaker" cylinders.

Other and further objects and advantages and the structures whereby they are attained will become more fully apparent from the following detailed description when read in connection with the drawings forming a part hereof.

In the drawings:

Figure 5 is a phantom plan view of my invention arranged with a down draft carburetor.

Figure 6 is a phantom plan view of my invention arranged with a side draft carburetor.

Figure 7 is a plan section of the head unit of my invention as used with a side draft carburetor.

Figure 8 is a central transverse section showing a portion of the channel of my invention relative to installation with a side draft carburetor.

Figure 1:
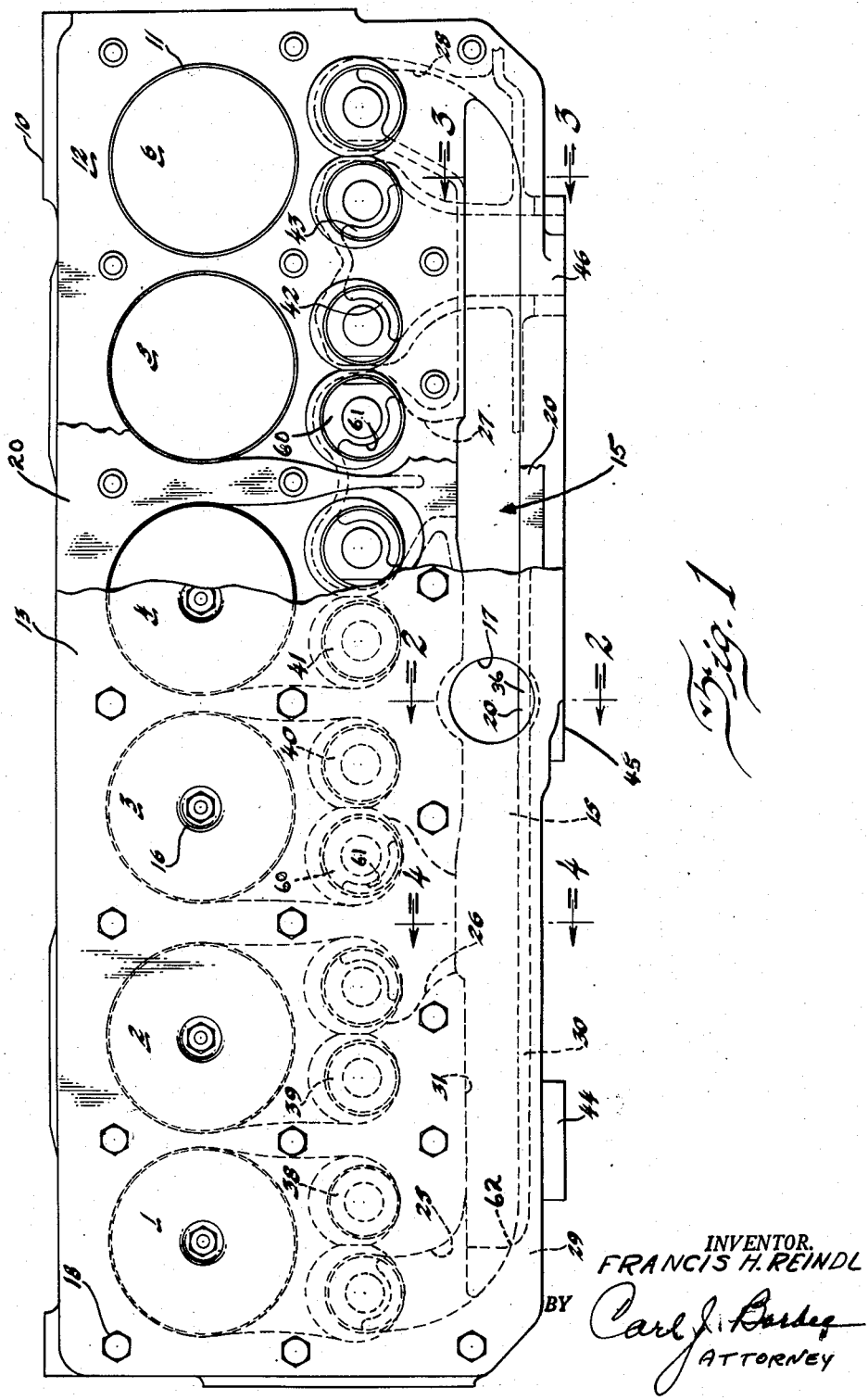
Figure 1 is a fragmentary plan sectional view of my improved fuel mixture distributing device.

In practically all internal combustion engines which use a carburetor to mix the engine fuel with air before delivering the fuel to a manifold for distribution to the several cylinders, it is practically impossible to obtain perfect carburetion. This is especially true during the warm up period. This condition may lessen somewhat as the engine becomes warm; however the fuel will not all be vaporized and accordingly there will be present a considerable amount of fuel in the form of large particles known as "heavy fuel" which will be carried along with the mixture of air and true fuel vapor. The "heavy fuel" tends to precipitate out of the rest of the fuel vapor and air mixture, and in engines having a long manifold, collects on the floor of the manifold. More liquid accordingly will collect adjacent the carburetor while a relatively small amount of "heavy fuel" will reach the end or ends of the manifold away from the carburetor, or in relation to the type of carburetor used, very little of the "heavy fuel" will reach certain of the cylinders.

As the intake valves of the various cylinders open, there is a rush of air and fuel vapor out of the manifold into the corresponding intake port. This rush of air and vapor will pick up or drain a considerable quantity of the "heavy fuel" off the floor of the manifold into the cylinder which is being charged. The cylinders near the carburetor will accordingly draw in more of the "heavy fuel" because more is present near their intake ports. This unequal fuel distribution leads to unequal power development in the various cylinders and somewhat uneconomical operation of the engine as a whole.

I have devised means for overcoming most of the above difficulties which consists generally of providing an elongated channel preferably formed in the cylinder head whereby as the head is fitted to a cylinder block separated only by the usual gasket, such channel and gasket will cooperate to form a shelf which will direct some of this "heavy fuel" into the path of the air stream entering the intake ports to those cylinders which need the additional fuel.

The engine consists of a cylinder block 10 having cylinder bores 11 therein arranged in line and having a plane upper surface 12 upon which is mounted a single head casting 13 which forms a head for the cylinder and a cover for a manifold 15. The head carries the ports 16 for mounting the usual spark plugs and a port 17 which communicates with any suitable type of carburetor (not shown) and the manifold 15. The head 13 is secured to the cylinder block by the usual head bolts 18. Cooling water space 19 is provided in the head 13 in the usual manner. A head gasket 20 is provided between the head and the cylinder block.

Intake manifold 15 is generally rectangular in cross section and extends longitudinally along the cylinder block. The manifold is symmetrical about the carburetor port 17 (see Figs. 1 and 5) which is positioned in the center, longitudinally of the head 13. Opening from the side of the manifold 15 are the intake ports 25, 26, 27 and 28 of which port 25 leads to end cylinder bore 1. Port 26, which is a double port, leads to two interior cylinder bores designated by the numerals 2 and 3. Port 27, which also is a double port, leads to two other interior cylinder bores designated by the numerals 4 and 5. Port 28, which is similar to port 25, leads to the other end cylinder bore designated by the numeral 6. All of these ports 25, 26, 27 and 28 communicate with the combustion chambers of their respective cylinders in the usual manner and the flow of fuel through the ports is controlled by the well known valves (not shown) which are usually associated with engines of the above type. The valve seats 60 have inlet ports 61 through which the fuel mixture enters the combustion chambers above the various cylinders.

Formed within the face 29 of the head 13 is an elongated channel 30 extending horizontally from and adjacent each end of said head and of a width greater than the width of the manifold 15. This channel 30 is arranged whereby when said head is positioned on said cylinder block, one longitudinal edge 31 of the channel 30 substantially registers with the back wall 32 of manifold 15 while the opposite edge 33 of said channel extends beyond the opposite manifold wall 34. This extension, designated by numeral 35 forms a shelf 36 with a portion of the gasket 20. It will be noted that this shelf 36 comprising the extension 35 and the portion 37 of the gasket 20 extends almost entirely along one horizontal edge of said manifold terminating at 62 adjacent the intake ports 25 and 28.

It will be noted in Fig. 1 that a portion of the carburetor opening 17 overhangs the shelf 36 so that some of the vaporized fuel ejected from the carburetor strikes the shelf directly. Under the arrangement as described above, a substantial amount of the heavy fuel will collect on the shelf 36 where fuel is discharged from the carburetor through port 17 into the manifold 15. Much of this heavy fuel will cling to and then travel along the shelf 36 under the inducement of the air stream created by the vacuum at the intake ports 25 and 28 and this fuel then passes into the ports 25 and 28 to supplement the fuel ordinarily discharged into the cylinder bores 1 and 6. In this manner a more even distribution of the "heavy fuel" along the length of the manifold is obtained.

Figure 2:
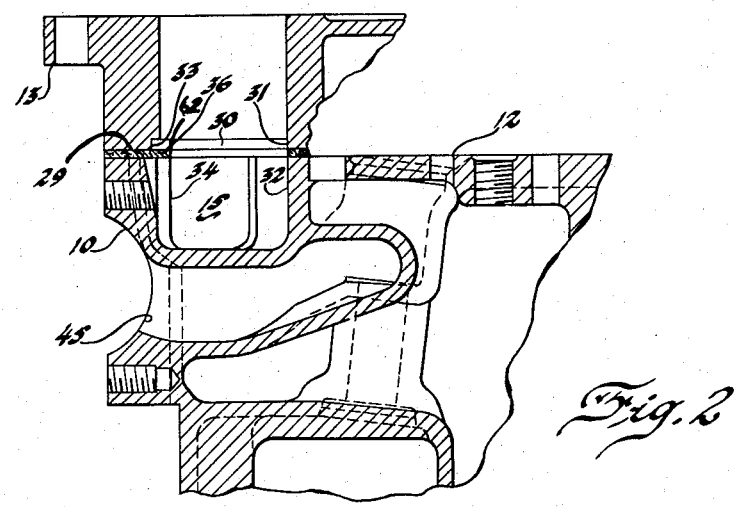
Figure 2 is a transverse sectional view taken on the line 2—2 of Figure 1.
Figure 3:
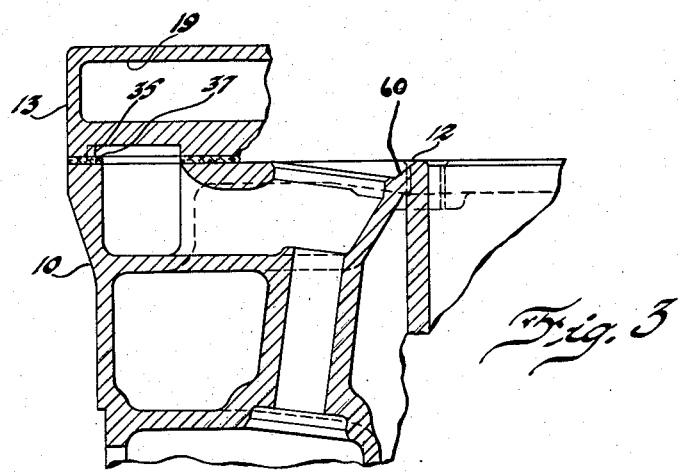
Figure 3 is a transverse sectional view taken on the line 3—3 of Figure 1.
Figure 4:
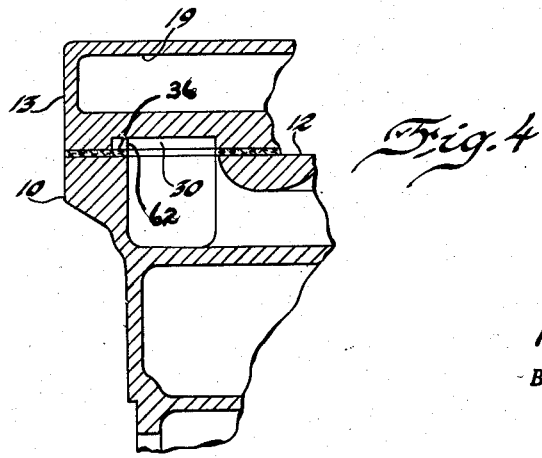
Figure 4 is a transverse sectional view taken on the line 4—4 of Figure 1.

The exhaust ports, designated by the numerals 38, 39, 40, 41, 42 and 43 are arranged in the usual manner, that is below the level of the intake manifold channel with 38 and 39 exhausting through port 44 (see Fig. 1) in the block and 40 and 41 through port 45 (see Figs. 1 and 2) and 42 and 43 exhausting through port 46 (see Fig. 1).

In Figures 6, 7 and 8, the manifold 15a is arranged with a so-called side draft carburetor. In this particular arrangement the carburetor port 17a is positioned in the center, longitudinally of the side of the manifold 15a. Unlike the construction as shown in Figures 1 through 5 and used with a down draft carburetor, extra heavy fuel must be supplied to cylinder bores 2a and 5a to provide for a more equal distribution of fuel to all the cylinder bores. In the arrangement of Figures 6, 7 and 8, I provide a cylinder block 47 and a second block or head 48. In addition, I provide a manifold cover 49. The head 48 includes the manifold 15a, the floor of said manifold indicated by the numeral 49a. The cover 49 covers the manifold 15a and includes a channel 50 similar to the channel 30 in head 13 of Figure 1 but arranged adjacent the back wall 51 of the manifold 15a. The width and depth of the channel 50 may be approximately the same as channel 30 but terminating at 64 adjacent intake port 52 leading to the cylinder bore 2a and to the intake port leading to the cylinder bore 5a as indicated in Figure 6.

In this particular application, the cover 49 and head 48 are separated by a gasket 53 and a portion of the gasket 53 forms a shelf 54 in conjunction with a part of the bore 55 and the channel 50 formed in the cover 49. As the mixture is forced through port 17a, such mixture is thrown against the back wall 51 of the manifold 15a and, some of course, into the channel 50. Heavy fuel from this mixture falls on the shelf 54 and passes over and along said shelf to fall into the manifold 15a at a point adjacent the intake ports feeding cylinder bores 2a and 5a where such heavy fuel is sucked into cylinder bores 2a and 5a. In this manner, as in the arrangement in Figure 1, additional or auxiliary fuel is directed to cylinders 2a and 5a and a more even distribution of the "heavy fuel" along the length of the manifold is obtained.

It will be noted that I have provided a fuel mixture distributing device of novel construction and of an arrangement which can be readily incorporated in production manufacturing. The devices by which I obtain the predetermined distribution of the fuel mixture do not require elaborate production operations and as a result full advantage may be taken of the improvements herein described and claimed with a minimum of expense and no adjustments or other adjustable controls necessary in obtaining the desired distribution of the fuel mixture throughout the engine speed range.

It will be apparent to those skilled in the art to which my invention pertains that various modifications and changes may be made therein without departing from the spirit of my invention or from the scope of the appended claims.

What I claim as my invention is:

1. In combination with a cylinder block having a manifold channel extending along the top thereof, a head for said block having a carburetor passage communicating with the manifold channel and arranged to fit over the middle of said manifold channel, said cylinder block having ports in open communication with the manifold channel and arranged along one side of said channel, the underside of said head having a channel formed therein adjacent said passage and communicating with said ports.

2. In combination with a cylinder block having a manifold channel extending along the top thereof, a head for said block having a carburetor passage arranged to fit over the middle of said manifold channel, said cylinder block having ports in open communication with the manifold channel and arranged along one side of said channel, the underside of said head having a longitudinally extending channel formed therein adjacent said passage and arranged to form a longitudinally extending shelf with the top side of said block.

3. In combination with a cylinder block having a manifold channel extending along the top thereof, a head for said block having a carburetor passage arranged to fit over the middle of said manifold, said cylinder block having ports in open communication with the manifold channel and arranged along one side of said channel, the underside of said head having a longitudinally extending channel formed therein adjacent said passage and arranged to form a longitudinally extending shelf with the top side of said block, said shelf oppositely disposed from said ports and communicating directly with a pair of said ports.

4. In combination with a cylinder block provided with multi-cylinder in line bores and having a manifold channel cast along the top of said block, a head for said block having a carburetor passage communicating with the manifold channel and arranged to fit over the middle of said manifold channel, said cylinder block having ports in communication with the manifold channel and formed symmetrically along one side of said manifold channel with respect to said carburetor passage, the underside of said head adjacent said passage having a longitudinally extending channel formed therein and arranged to form a longitudinally extending shelf with the top side of said block, said shelf oppositely disposed from said ports, said shelf terminating adjacent the end cylinder bores.

5. A fuel mixture distributing device for a multi-cylinder engine and including a manifold structure provided with a plurality of port outlets spaced longitudinally along one side of said manifold adapted for communication with the engine cylinders, said engine comprising a block wherein said manifold is cast along the top thereof, a head covering said block and manifold and provided with a carburetor passage arranged to fit over the middle of said manifold, said port outlets including end and intermediate outlets, said head provided with a longitudinally extending channel formed on the underside thereof, a gasket disposed between said head and block and arranged to form a shelf in cooperation between the top side of said block and said channel, said channel terminating adjacent said end outlets.

6. A manifold structure for a multi-cylinder engine including a conducting portion extending longitudinally of the engine and adapted for carrying fuel precipitates, said conducting portion having a port outlet at each end and a plurality of intermediate port outlets, said port outlets each communicating with an engine cylinder, a block wherein said conducting portion is associated along the top thereof, a head covering said block and said conducting portion, said head provided with a longitudinal channel, a gasket spaced intermediate said block and head and forming a shelf in cooperation with said block and channel, said shelf adapted to collect a portion of said fuel precipitates and deflect said fuel precipitates toward said end outlets whereby to effect substantially uniform distribution of said fuel precipitates to said engine cylinders.

7. In combination with a cylinder head having a manifold channel extending along the top thereof, a cover for said manifold channel, said head having a carburetor passage in the side thereof communicating with the manifold channel, the underside of said cover having a channel formed therein opposite from said carburetor passage, said head having a port outlet at each end and a plurality of intermediate port outlets all communicating with the manifold channel, said channel terminating adjacent a pair of said intermediate port outlets.

8. In combination with a cylinder head having a manifold channel cast and extending along the top thereof, a cover for said manifold channel, said head having a carburetor passage in one side thereof communicating with the manifold channel, said head at a side opposite from said carburetor passage having a port outlet at each end and a plurality of intermediate port outlets all communicating with the manifold channel, said cover having a longitudinally extending channel formed therein adjacent said intermediate port outlets, a gasket spaced intermediate said head and cover and forming a shelf in cooperation with said channel and said head, said shelf terminating adjacent a pair of said intermediate port outlets.

9. A fuel mixture distributing device for a multi-cylinder engine and including a manifold structure provided with a plurality of port outlets spaced longitudinally along one side of said manifold adapted for communication with the engine cylinders, said engine comprising a cylinder head wherein said manifold is cast along the top thereof, a cover for said manifold, said manifold structure having a carburetor passage arranged in the side thereof opposite from said port outlets, said port outlets including end and intermediate outlets, said cover provided with a longitudinally extending channel formed on the underside thereof, a gasket spaced intermediate said head and channel and arranged to form a shelf in cooperation between the top side of said head and said channel, said shelf terminating adjacent said intermediate port outlets immediately adjacent said end port outlets.

10. A manifold structure for a multi-cylinder engine including a conducting portion extending longitudinally of the engine and adapted for carrying fuel precipitates, said conducting portion having a port outlet at each end and a plurality of intermediate port outlets, said port outlets each communicating with an engine cylinder, said engine comprising a cylinder head wherein said manifold is cast along the top thereof, a cover for said manifold, the side of said manifold structure having a carburetor passage arranged therein opposite from said port outlets, said cover provided with a longitudinally extending channel formed on the underside thereof, a gasket spaced intermediate said head and channel and arranged to form a shelf in cooperation between the top side of said head and said channel, said shelf adapted to collect a portion of said fuel precipitates and deflect said fuel precipitates toward said intermediate port outlets adjacent said end port outlets.

11. A fuel distributing device for an internal combustion engine comprising: an engine block, said block having a longitudinally extending fuel distribution channel formed in its upper face, a floor for said fuel distribution channel, said block also having several cylinder bores arranged alongside of the fuel distribution channel, said block also having passages formed therein for establishing communication between the fuel distribution channel and the cylinder bores; a cover fixed to the block for covering the fuel distribution channel; said cover having a fuel inlet port communicating with the fuel distribution channel, said block and cover having an auxiliary channel extending alongside of the fuel distribution channel, a ledge serving as the floor of the auxiliary channel along which fuel is free to travel, said fuel inlet port being positioned to deposit some fuel onto the ledge, said ledge lying in a plane above the plane of the floor of the fuel distribution channel, said ledge and auxiliary channel terminating adjacent a pre-selected passage leading to a pre-selected cylinder bore, whereby auxiliary fuel is deposited in the vicinity of the mouth of such passage.

FRANCIS H. REINDL.

References Cited in the file of this patent

UNITED STATES PATENTS

| Number | Name | Date |
|---|---|---|
| 1,412,266 | Berger | Apr. 11, 1922 |
| 1,656,051 | Fekete | Jan. 10, 1928 |
| 2,251,604 | Sladky | Aug. 5, 1941 |
| 2,257,631 | Wahlberg | Sept. 30, 1941 |